United States Patent Office 3,687,695
Patented Aug. 29, 1972

3,687,695
CRYSTALLINE FORM V AMMONIUM POLY-PHOSPHATE AND PROCESS FOR PRODUCING SAME
David R. Dyroff, Creve Coeur, Mo., assignor to Monsanto Company, St. Louis, Mo.
No Drawing. Original application May 28, 1968, Ser. No. 732,506, now Patent No. 3,592,588. Divided and this application Mar. 26, 1970, Ser. No. 30,613
Int. Cl. C09g 1/02
U.S. Cl. 106—3     6 Claims

ABSTRACT OF THE DISCLOSURE

A new crystalline form of ammonium polyphosphate and processes for producing same are disclosed. The new ammonium polyphosphate is a useful ingredient in metal polishes.

---

This invention is a divisional of U.S. patent application Ser. No. 732,506, filed May 28, 1968 and now U.S. Pat. No. 3,592,588 and relates to ammonium polyphosphates. More particularly, it relates to a new crystalline form of ammonium polyphosphate useful as an ingredient in metal polish and processes for preparing same.

Various crystalline forms of ammonium polyphosphate are known. In general, the two most common forms, Form I and Form II, are prepared by conducting a thermal condensation reaction between a phosphate source and ammonia source in the presence of a combined ammoniating and condensing agent. Whether Form I or Form II is produced is dependent upon the type of seed crystals present in the reaction medium and the temperature at which the thermal condensation is conducted. These common forms of ammonium polyphosphate have physical properties which are distinct from each other and from the material of the present invention. These materials, that is, Form I and Form II, are useful in the manufacture of intumescent fire-retardant coatings and fertilizers.

The new crystalline form of ammonium polyphosphate of the present invention can be employed as a major component in metal polishes whereas it is not as good as crystalline Form I or Form II in fire-retardant coating compositions. More particularly, the new ammonium polyphosphate of the present invention reduces the harshness of the abrasives which are normally used in metal polishes and thereby enables polishes having a relatively high level of abrasives to be used to polish even relatively soft metals such as silver and the like without scratching the metals. It is believed, therefore, that the new crystalline form of ammonium polyphosphate and the processes for preparing same constitute an advance in the art.

In accordance with this invention it has been discovered that by heat treating Form I or Form II ammonium polyphosphate at a temperature above about 340° C. and below about 420° C. in an atmosphere containing ammonia and thereafter quickly cooling the material, a new crystalline Form V ammonium polyphosphate is produced which can be stored at room temperature. Form V appears to be the equilibrium crystalline phase under the above conditions and therefore it is expected that it could also be made from other raw materials of the same chemical composition. The region of stability may actually be somewhat broader than that indicated above.

Form I and Form II ammonium polyphosphate is preferably prepared by the process disclosed in co-pending U.S. patent application Ser. No. 420,459, filed on Dec. 22, 1964, which is incorporated herein by reference. The Form I or Form II ammonium polyphosphates can be formed in situ and then further heat treated in accordance with the procedure hereinafter described.

When preparing Form V ammonium polyphosphate by heat treatment of Form I, some of the Form I ammonium polyphosphate is converted to Form V in a relatively short period of time, but to produce a relatively pure product, it is necessary to continue the heating until the reaction is essentially complete. At 385° C. a tempering period exceeding about 20 hours is adequate. The time will vary according to the temperature used, for example, it is also necessary to conduct the heating in an atmosphere containing ammonia. Preferably the partial pressure of ammonia in the gas phase should exceed the equilibrium ammonia vapor pressure of the Form V ammonium polyphosphate and ammonia pressures as high as 90 p.s.i. can be used. After sufficient conversion of Form I to Form V ammonium polyphosphate has occurred, the Form V ammonium polyphosphate is cooled rapidly to room temperature. Relatively high rates of cooling, that is, above about 50° C./minute must be used to prevent an appreciable conversion of the Form V ammonium polyphosphate to Form II ammonium polyphosphate. The Form V ammonium polyphosphate can be contaminated with some Form II ammonium polyphosphate and be suitable for some uses; however, it is preferred in most instances to provide a product which is relatively free of Form II ammonium polyphosphate; therefore, cooling rates above about 50° C./minute are necessary to avoid large amounts of Form II ammonium polyphosphate in the product. It is particularly desirable to use even higher rates of cooling through the range of 350° C. to 250° C., that is, above about 75° C./minute to minimize the Form II ammonium polyphosphate formation.

The X-ray diffraction pattern for Form V ammonium polyphosphate is distinctly different than the pattern for the other known forms of ammonium polyphosphate as shown in Table I.

Form V ammonium polyphosphate crystals are orthorhombic with the following approximate parameters:

$a = 4.346$ A., $b = 6.135$ A., $c = 13.646$ A. $\pm 0.02$ A.

Form II ammonium polyphosphate is believed to be the most similar form and also has an orthorhombic crystal structure having the following parameters:

$a = 4.256$ A., $b = 6.475$ A., $c = 12.04$ A. $\pm 0.01$ A.

The crystallographic data on the various ammonium polyphosphates establishes that the new form is a distinct and different crystalline form having different properties. It has also been found to behave differently from other forms in practical applications. For example, Forms I and II are suitable for use in intumescent paints whereas Form V is TABLE I—X-RAY DIFFRACTION DATA [a]

| Form V Line [b] | d, A. | Form I Line [b] | d, A. | Form II Line [b] | d, A. | Form III Line [b] | d, A. | Form IV Line [b] | d, A. |
|---|---|---|---|---|---|---|---|---|---|
| 1 | 5.59 | 1 | 6.06 | 1 | 5.70 | 1 | 6.65 | 1 | 5.70 |
| 2 | 3.41 | 2 | 5.47 | 2 | 6.06 | 2 | 5.68 | 2 | 5.60 |
| 3 | 6.82 | 3 | 3.83 | 3 | 3.08 | 3 | 5.40 | 3 | 3.42 |
| 4 | 3.67 | 4 | 3.50 | 4 | 2.93 | 4 | 3.52 | 4 | 7.00 |
| 5 | 2.80 | 5 | 3.24 | 5 | 3.37 | 5 | 3.80 | 5 | 6.10 |

[a] CuK alpha radiation.
[b] Five strongest lines in order of decreasing intensity (the complete pattern contains other lines of lesser intensity).

generally considered to be unsatisfactory because the viscosity of the paint is undesirably high. It has been discovered, however, that Form V ammonium polyphosphate is a useful ingredient in metal polishes where a high viscosity is desired thus making possible a formulation containing relatively high levels of water while maintaining a suitable viscosity of the metal polish.

The new crystalline Form V ammonium polyphosphate is useful as a major ingredient in metal polishes, particularly those which are used to polish relatively soft metals such as silver and can be used in amounts of from about 10% to about 80% by weight, on an anhydrous basis with amounts of from 30% to 60% by weight being preferred.

Silver polishes generally contain a surface active agent, an abrasive, a thickener, or builder and water. Although Form V ammonium polyphosphate can itself serve as a polishing agent, it is preferred to incorporate another abrasive such as a finely divided silica in a formulation to provide good tarnish removal. The harshness of the other abrasive is modified by the Form V ammonium polyphosphate so that soft metals such as silver are not scratched. It is also believed that Form V ammonium polyphosphate acts as a builder for the surfactant, thus providing a polish having a greater cleaning power than polishes that do not contain the ammonium polyphosphate. It is also to be noted that formulations containing Form V ammonium polyphosphate show no separation even after relatively prolonged periods of storage. It is believed that when incorporated in a formulation for metal polishing which contains an anionic surfactant with a cation other than $NH_4^+$ that there is some cation exchange that occurs causing a portion of the ammonium polyphosphate to go into solution and that the dissolved polyphosphate acts as a thickener for the formulation.

Suitable surface active agents which can be used for metal polishing include the anionic and nonionic surface active agents. Anionic surface active agents are well known in the art and examples of these are found in Surface Active Agents, Schwartz, Perry and Berch, Interscience Publishers, Inc. New York (1958). The alkali metal salts of alkyl aryl sulfonic acids are useful in the practice of this invention and generally contain an aryl group selected from the group consisting of benzene, naphthalene, lower alkyl substituted benzene, and lower alkyl substituted naphthalene. The alkyl group, attached to the aryl group, generally is a higher alkyl group; that is, containing from about 6 to about 30 carbon atoms and can be branched or straight chain, alhough straight chain materials with a chain length of from about 10 to about 14 carbons are preferred.

Examples of alkyl aryl sulfonic acids whch can be utilized in the practice of this invention include dodecyl benzene sulfonic acid, tridecyl benzene sulfonic acid, tetradecyl benzene sulfonic acid, decyl naphthylene sulfonic acid, nonyl toluene sulfonic acid, tetracocyl benzene sulfonic acid and the like and various mixtures of these.

The alkyl sulfonic acids typical of those useful in the practice of this invention generally contain from about 8 to about 20 carbon atoms. The alkyl portion can be branched or straight chain with straight chain being preferred. Typical examples include dodecyl sulfonic acid, tetradecyl sulfonic acid, octyl sulfonic acid, and eicosyl sulfonic acid.

The polyethylene ether sulfuric acids are useful in the practice of this invention and are generally prepared by sulfating the condensation product of ethylene oxide with alkyl phenol or a higher aliphatic alcohol. The alkyl portion of the alkyl phenol generally contains from about 6 to about 20 carbon atoms. When a higher aliphatic alcohol is condensed with ethylene oxide, the alcohol generally will contain from about 6 to about 30 carbon atoms. Usually from about 3 to about 30 moles of ethylene oxide per mole of alkyl phenol or higher aliphatic alcohol are used. The alkyl groups can be either branched or straight chain.

Illustrative of the ethylene oxide ether sulfuric acids useful in the practice of this invention are those produced by the sulfonation of the condensation product of 9 moles of ethylene oxide with one mole of dodecyl alcohol; the sulfonated condensation product of 8 moles of ethylene oxide and one mole of tridecyl alcohol and the sulfonated product obtained from condensing 3 moles of ethylene oxide with one mole of tetradecyl alcohol.

The fatty acids, typical of those useful in this invention generally contain mixtures of acids having from about 8 to about 20 carbon atoms, as, for example, coconut oil acid, oleic acid, tallow acid and the like.

In some instances, it may be desired to incorporate nonionic surface active agents into the formulation. Nonionic surface active agents are well known in the art and examples can be found in Surface Active Agents, Schwartz, Perry and Berch, supra. Typical examples of nonionics useful in the practice of this invention include those which are made by reacting an alkylene oxide such as ethylene oxide, butylene oxide, propylene oxide and the like with fatty acids, a straight or branched chain alcohol, phenols, thiophenols, amides, or amines to form polyoxyalkylene alkyl esters and ethers, polyoxyalkylene glycol ethers and esters, polyoxyalkylene alkyl phenols, polyoxyalkylene thiophenols, and polyoxyalkylene amides and amines and the like. It is generally preferred to react from about 3 to about 30 moles of alkylene oxide per mole of the fatty acids, alcohols, phenols, thiophenols, amides or amines. Compounds illustrative of the synthetic nonionic surface active agents include the products obtained from condensing ethylene oxide or propylene oxide with the following: propylene glycol, ethylene diamine, diethylene glycol, dodecyl phenol, tetradecyl alcohol, N-octadecyl diethanolamide, and N-dodecyl monoethanolamide.

It is generally preferred that the anionic surface active agents be used such as the water-soluble salts of the alkyl benzene sulfonic acids, more particularly, those in which the alkyl portion is straight chain and contains from about 10 to about 14 carbon atoms and in which the cation is other than the ammonium ion. In most instances, surface active agents will be used at levels of from about 5% to about 40% by weight on an anhydrous basis with from about 10 to about 30% by weight being preferred. The use of the preferred surfactant in the polishing formulation results in an increased solubilization of the polyphosphate portion and increases the amount of water than can be incorporated into the formulation while maintaining a proper consistency to the formulation. Increased water content is economically attractive and in most formulations is advantageous in the functioning of a polish since the surfactants are expected to function better in the presence of a larger amount of water. Thus, the water level can be increased to about 50% by weight of the total formulation without producing an undesirably low viscosity.

Any of the insoluble abrasives that are generally used in metal polishes can be used in conjunction with the Form V ammonium polyphosphate of this invention such as finely divided silica, diatomite, metallic oxides and the like. As previously mentioned, the harshness of the abrasive is generally modified to a significant degree by the ammonium polyphosphate thereby making possible the use of more abrasive with less tendency to scratch the metal, which yields a formulation having improved cleaning efficiency. The abrasives can be used at levels of from about 10% to about 50% by weight of the formulation on an anhydrous basis with amounts of from about 20 to about 40% by weight being preferred.

The weight ratio of surface active agent to ammonium polyphosphate will generally be from about 4:1 to about 1:15 and the weight ratio of Form V ammonium polyphosphate to abrasive will generally be from about 1:5 to 8:1. The following examples are presented to more fully illustrate this invention. All parts and percentages are by weight unless otherwise specified.

EXAMPLE 1

Form I ammonium polyphosphate having an X-ray diffraction pattern as shown in Table I is heated to about 385° C. for about 24 hours in a sealed container filled about 90% full. The material is cooled rapidly to room temperature by quenching the material in liquid nitrogen. A sample is analyzed by X-ray diffraction and exhibits the X-ray diffraction pattern for Form V ammonium polyphosphate as shown in Table I. The novel material shows no reversion to any other form of ammonium polyphosphate even after prolonged periods of storing at room temperature and atmospheric pressure. Elemental and structural analyses of the material indicate that the product is an ammonium polyphosphate having the empirical formula:

$$H_{(n-m)+2}NH_{4m}P_nO_{2n+1}$$

wherein $n$ is an integer having an average value above about 10, the value of $m/n$ is between about 0.95 and about 1.1 and the maximum value of $m$ is equal to $n+2$. The average value of $n$ is greater than 10 which is evidenced by the paper chromatography method [Karl-Kroupa, Anal. Chem. 28, 1091 (1956)]. The polymeric P—O—P linkage is evidenced by N.M.R. spectra which indicate substantially no P—N—P linkages and no ortho, pyro or short chain P—O—P type group and by infrared spectra which indicate P—O—P type linkages but do not indicate substantially any P—N type linkages.

EXAMPLE 2

Six polishes are prepared by blending various materials as is shown in Table II.

TABLE II.—SAMPLE COMPOSITION [1]

| Sample No. | APP [2] | Abrasive (silica) | Active | Type of active | Wt. percent H₂O |
|---|---|---|---|---|---|
| 1 | 40.5 (80) | 0 (0) | 10.1 (20) | Anionic [3] | 49.4 |
| 2 | 53.4 (80) | 0 (0) | 13.3 (20) | Nonionic [4] | 33.3 |
| 3 | 21.7 (40) | 21.7 (40) | 10.8 (20) | Anionic | 45.8 |
| 4 | 28.0 (40) | 28.0 (40) | 14.1 (20) | Nonionic | 29.9 |
| 5 | 25.1 (50) | 12.5 (25) | 12.5 (25) | Anionic | 49.9 |
| 6 | 0 (0) | 36.1 (50) | 36.3 (50) | ....do...... | 27.6 |

[1] The numbers in parentheses are the percentages on an anhydrous basis.
[2] APP is the designation for the Form V ammonium polyphosphate prepared in Example 1.
[3] Sodium alkyl benzene sulfonate containing an alkyl group having from about 10 to about 14 carbon atoms.
[4] Alkyl aryl polyoxyethylene ether.

The polishers are tested and their performance is as given in Table III.

TABLE III.—SAMPLE PERFORMANCE

| Sample No. | 1 | 2 | 3 | 4 | 5 | 6 |
|---|---|---|---|---|---|---|
| Initial pH | 7 | 6 | 7+ | 6 | 7+ | |
| pH after 3 weeks | 6-7 | 6 | 6-7 | 6 | | |
| Polishing ability | Good | Good | Good | Good | Good | Poor. |
| Ease of application | OK | OK | OK | OK | OK | OK. |
| Ease of rinsing | Poor | Poor | OK | OK | OK | OK. |
| Tarnish removal | do | do | Good | Good | Moderate | Good. |
| Tendency to scratch | None | None | Slight | Moderate | Slight | Very high. |

The above results indicate that the polishes containing Form V ammonium polyphosphate, an abrasive, and a surface active agent are good silver polishers while those in which either silica or Form V ammonium polyphosphate is absent are not satisfactory polishes since a good silver polish must remove tarnish and not scratch the silver.

What is claimed is:

1. A metal polish consisting essentially of from about 10% to 80% by weight on an anhydrous basis of Form V ammonium polyphosphate having the following strong X-ray diffraction lines:

| Line: | d, A. |
|---|---|
| 1 | 5.59 |
| 2 | 3.41 |
| 3 | 6.82 |
| 4 | 3.67 |
| 5 | 2.80 | and, a surface active agent, water and an abrasive.

2. A metal polish according to claim 1 wherein said surface active agent is an anionic surface active agent.

3. A metal polish according to claim 2 wherein said abrasive is silica.

4. A metal polish according to claim 1 wherein said amount of surface active agent is from about 5% to about 40% by weight on an anhydrous basis, said abrasive is from about 10% to about 50% by weight on an anhydrous basis.

5. A polish according to claim 4 wherein said surface active agent is an alkyl benzene sulfonate containing from about 10 to about 14 carbon atoms.

6. A polish according to claim 5 wherein said abrasive is silica and said water content is from about 30% to about 70%.

References Cited

UNITED STATES PATENTS

| | | | |
|---|---|---|---|
| 3,513,114 | 5/1970 | Hahn | 106—15 FP |
| 2,428,178 | 3/1947 | Reik | 23—182 |
| 2,829,106 | 4/1958 | Ruff | 23—106 A |

THEODORE MORRIS, Primary Examiner